(12) United States Patent
Pohl (10) Patent No.: US 8,043,193 B2
(45) Date of Patent: Oct. 25, 2011

(54) GEAR MECHANISM FOR A HEALD SHAFT DRIVE

(75) Inventor: Gerhard Pohl, Albstadt (DE)

(73) Assignee: Groz-Beckert KG, Bremen (DE)

( * ) Notice: Subject to any disclaimer, the term of this patent is extended or adjusted under 35 U.S.C. 154(b) by 569 days.

(21) Appl. No.: 11/984,960

(22) Filed: Nov. 26, 2007

(65) Prior Publication Data

US 2008/0125266 A1    May 29, 2008

(30) Foreign Application Priority Data

Nov. 24, 2006   (EP) ..................... 06024372

(51) Int. Cl.
  *F16H 35/02*  (2006.01)
  *F16H 37/12*  (2006.01)
  *F16H 57/08*  (2006.01)

(52) U.S. Cl. ............ 475/331; 475/17; 475/334; 475/904

(58) Field of Classification Search .................. 475/14, 475/17, 149, 317, 329, 331, 334, 343, 904
  See application file for complete search history.

(56) References Cited

U.S. PATENT DOCUMENTS

| | | | | | |
|---|---|---|---|---|---|
| 1,389,622 | A | * | 9/1921 | Buehler | 475/343 |
| 3,407,678 | A | * | 10/1968 | Steinke | 475/14 |
| 3,473,414 | A | * | 10/1969 | Shachter | 475/249 |
| 3,919,895 | A | * | 11/1975 | Kerr | 475/16 |
| 4,012,964 | A | * | 3/1977 | Lee | 74/435 |
| 4,393,902 | A | * | 7/1983 | Brock | 139/76 |
| 4,784,005 | A | * | 11/1988 | Balken | 74/42 |
| 5,107,901 | A |  | 4/1992 | Pages et al. | |
| 5,653,268 | A |  | 8/1997 | Burkert | |
| 7,549,939 | B2 | * | 6/2009 | Strauss et al. | 475/5 |

FOREIGN PATENT DOCUMENTS

| | | |
|---|---|---|
| DE | 3730087 | 3/1989 |
| JP | S52-089566 U1 | 7/1977 |
| JP | S61-206853 A | 9/1986 |
| JP | S61-290260 A | 12/1986 |
| JP | 63-9551 | 1/1988 |
| JP | S63-034344 A | 2/1988 |
| JP | 07-003568 | 6/1995 |
| JP | 08-311738 | 11/1996 |
| JP | 2001-064842 | 3/2001 |

OTHER PUBLICATIONS

Office Action issued Aug. 17, 2010, in corresponding Japanese Application No. 2007-296499.

* cited by examiner

*Primary Examiner* — Tisha Lewis
(74) *Attorney, Agent, or Firm* — Fitch, Even, Tabin & Flannery; Norman N. Kunitz (57) ABSTRACT

A gear mechanism for the drive assembly of a heald shaft (1), wherein the gear mechanism (6, 6a, 6b, 6c) comprises an input shaft (7, 7b, 7c) and an output shaft (5, 5b, 5c). The gear mechanism (6, 6a, 6b, 6c) generates a differential angle of rotation between the input shaft (7, 7b, 7c) and the output shaft (5, 5b, 5c) that is superimposed on the angle of rotation and, in dependence on the angle of rotation, is subjected to an oscillating change. This oscillating change can differ from a harmonic oscillation as a result of the non-circular design of the planet gears (11a, 12a, 13a) of the gear mechanism (6, 6b, 6c), thereby making it possible to realize almost any optional movements for the heald shaft (1), with low strain on the gears and the bearings. A simple production method and a compact design are disclosed.

11 Claims, 6 Drawing Sheets

GEAR MECHANISM FOR A HEALD SHAFT DRIVE

CROSS REFERENCE TO RELATED APPLICATION

This application claims the priority of European Patent Application No. 06 024 372.2, filed on Nov. 24, 2006, the subject matter of which, in its entirety, is incorporated herein by reference.

BACKGROUND OF THE INVENTION

The invention relates to a gear mechanism for a heald shaft drive.

Weaving machines or looms are equipped with a so-called heald shaft or heald frame, which is an essentially rectangular frame carrying a large number of healds. The healds purposely guide the warp threads out of a warp thread plane in order to form a shed. For this, the heald shaft must be moved up and down according to specific settings with the aid of so-called shaft drives that generate an oscillating back and forth movement at the power take-off. This movement is transmitted via a rod assembly to the heald shaft. The oscillating back and forth movement of the power take-off is normally derived from a constant rotational movement of a drive shaft. If an eccentric gear mechanism is used for this, a fixedly specified connection exists between the rotational movement of the input shaft and the oscillating movement at the power take-off, wherein this movement for the most part corresponds to a sine movement.

Reference DE 691 09 899 T2 discloses different options for superimposing a movement with periodic acceleration and delay onto a constant rotational movement at the input of the shaft gear mechanism. Used for this can be a gear mechanism consisting of a hollow gear, two rotating planet gears and a coupling mechanism. The rotating planet gears are connected via cranks and connecting rods to the lever arms on the output shaft in order to rotate the output shaft.

With this type of gear mechanism, the load strain on the two planet gears can be different.

Starting from the above, it is the object of the present invention to create an improved gear mechanism for driving a heald shaft.

SUMMARY OF THE INVENTION

The above object generally is solved with the gear mechanism as disclosed in claim 1:

The inventive gear mechanism comprises a planet gear with one hollow gear, a planet carrier with at least one planet gear and one sun gear. In addition, the gear mechanism is provided with a coupling mechanism for connecting the at least one planet gear to the output shaft.

The drive mechanism acts upon at least one element of the planet gear, meaning upon the hollow gear, the planet carrier, or the sun gear. In that case, at least on additional element of the planet gear is blocked, e.g., the hollow gear or the sun gear. For one preferred embodiment, however, two elements of the planet gear, for example the hollow gear and the planet carrier, are driven while the third element of the planet gear, in this case the sun gear, rotates freely, which results only in a torque-proof connection of the planet gears among themselves and provides support for the planet gears toward the inside.

According to one preferred embodiment, the planet gears and thus also the hollow gear and the sun gear are formed non-circular. With a uniform rotation of the planet carrier, the planet gear thus executes an accelerated and a delayed movement, corresponding to its non-circular shape. This movement is impressed as further modulation onto the output shaft movement, in addition to movement modulation caused by the coupling mechanism. In this way, almost any law of motion can be realized for the movement of the shaft drive power take-off by correspondingly designing the non-circular shape of the planet gears, the hollow gear and the sun gear. This opens up the possibility of achieving predetermined movement courses without the use of cam discs and cam followers.

The sun gear, the at least one planet gear and the hollow gear are coordinated so as to constantly mesh, even if they have a design that deviates from the round or circular shape.

If the planet gear is formed as a gear mechanism with non-circular gears, having at least one planet gear with a non-constant radius, as well as a matching hollow gear, then the sun gear can be omitted in some cases. In that case, the gear mechanism comprises at least one hollow gear with toothing on the inside, at least one planet gear with toothing on the outside that constantly meshes with the inside toothing of the hollow gear, a planet carrier on which the at least one planet gear is positioned rotating, as well as a drive mechanism for driving the planet carrier and an output shaft, which is connected via a coupling mechanism to the at least one planet gear. The planet gear in that case has a variable radius along the circumference, resulting in at least one maximum diameter and at least one minimum diameter. This type of arrangement can also be used for the movement connection with a non-sinusoidal time course for the angle of twist between the input shaft and the output shaft.

Regardless of whether a sun gear is actually provided or has been omitted, the ratio between the circumference of the sun gear that fits between the planet gears and the circumference of the at least one planet gear should preferably be fixed as a whole number. In that case, the sun gear and the planet gear can either be embodied circular or non-circular.

For toothed gears, the terms "circular" and/or "non-circular" refer to the shape of the partial circle determined by the respective toothed gear.

The preferred gear mechanism comprises at least three planet gears. The drive moment is therefore transmitted at three positions and any bearing loads that occur are correspondingly reduced, making it possible to have a high power transfer with optimum power distribution and smoothness of running, which results in a high degree of efficiency. The most varied laws of motion can be realized when using the concept of a planet gear with non-circular gears. The term "law of motion" in this connection is understood to refer to the timely course of the angle of twist between the input shaft and the output shaft. The planet gear can also be embodied so as to be closed toward the outside, thereby permitting a permanent lubrication of the toothed gears and an easy assembly.

Additional details of advantageous embodiments of the invention are the subject matter of the claims and the drawing or the specification.

The drawing illustrates exemplary embodiments of the invention.

DETAILED DESCRIPTION OF THE INVENTION

Figure 1:
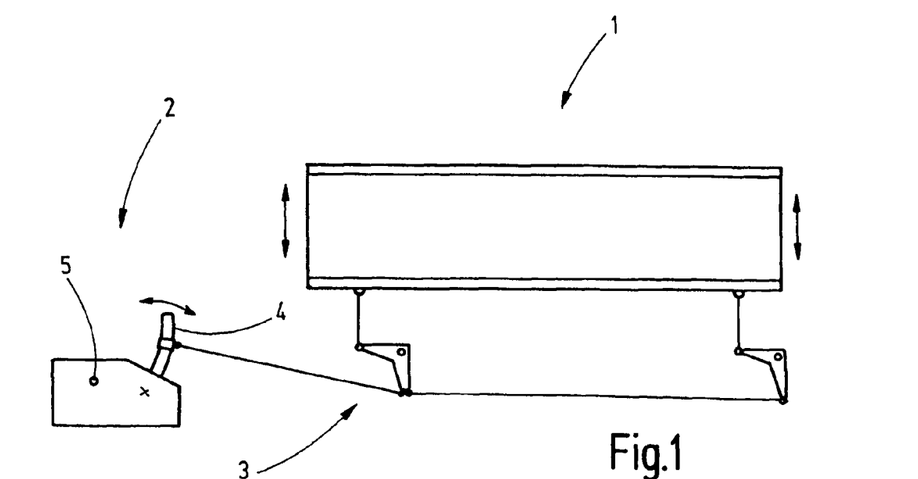
FIG. 1 is a schematic representation of a heald shaft with shaft drive.
Figure 2:
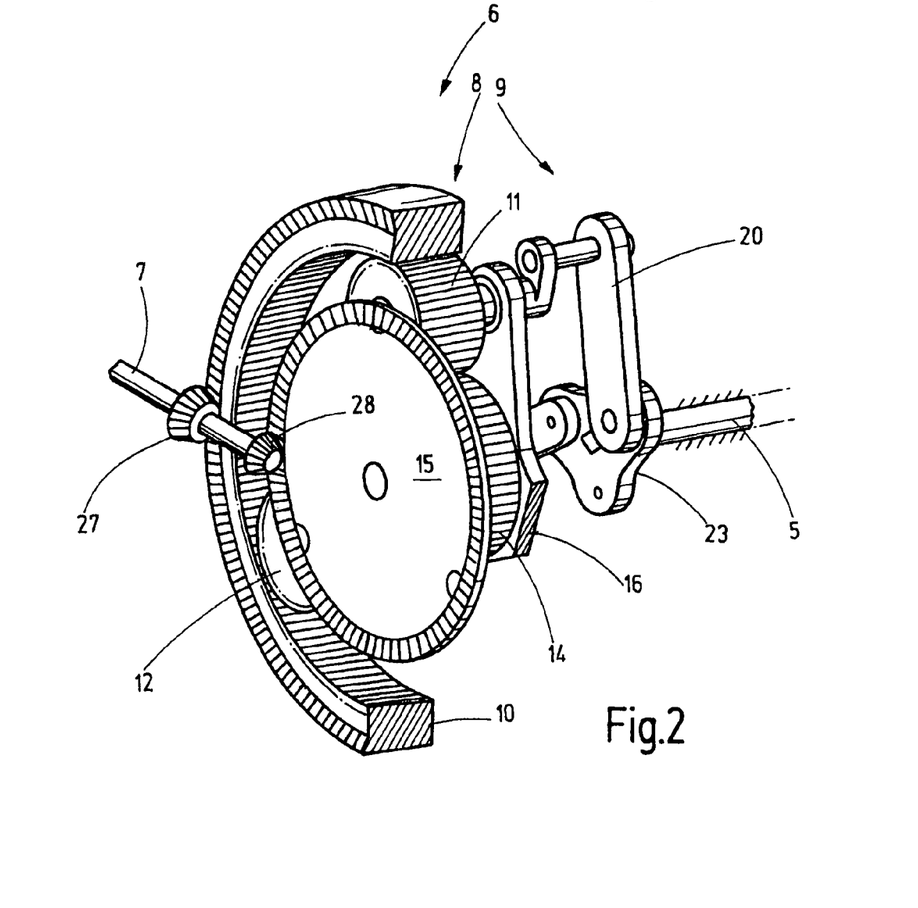
FIG. 2 illustrates a reduction gear for the shaft drive according to FIG. 1, in a schematic but partially corporeal, perspective and also in part sectional view.

FIG. 1 shows a heald shaft 1 with associated shaft drive 2, which causes the up and down movement of the heald shaft 1, indicated by two arrows, with the aid of a rod assembly 3. The shaft drive 2 comprises a rocker 4 that carries out a back and forth oscillating movement, which can be derived via an eccentric gear mechanism from the rotation of a shaft 5. If this rotation is constant, neither accelerated nor delayed, the movement of the heald shaft 1 substantially corresponds to a sinusoidal oscillation. Deviations from the sinusoidal shape caused by the rod assembly 3 and the connecting rod to the power take-off for the rocker 4 are ignored in this case. However, with the shaft drive according to the invention, the shaft 5 movement is not a constant rotational movement. Instead, a rotational movement is generated at an output shaft that coincides with the shaft 5 with the aid of a gear 6 that functions as a reduction gear, as shown in FIG. 2, wherein this rotational movement is modulated relative to an input shaft 7. A differential angle φ which oscillates based on a predetermined principle thus exists between the actual angle of rotation for the input shaft 7 and the actual angle of rotation for the shaft 5. This is achieved with the gear 6, which transmits the rotational movement from the input shaft 7 to the shaft 5 and, in the process, superimposes an additional movement.

The gear 6 comprises a planet gear 8 and a coupling mechanism 9. The planet gear 8 includes a hollow gear 10, at least one and preferably several planet gears 11, 12, 13 (see also FIG. 3) and optionally at least one sun gear 14. The hollow gear is provided with an inside toothing, while the planet gears 11, 12, 13 are provided with an outside toothing. The sun gear 14 is also provided with an outside toothing. The sun gear 14 and the planet gears 11, 12, 13 constantly mesh. The planet gears 11, 12, 13 and the hollow gear 10 also constantly mesh. The planet gears 11, 12, 13 are positioned rotating on a planet carrier 15, which in turn is positioned so as to rotate around the sun gear 14 axis. The planet gears 11 to 13 are held in place between the planet carrier 15 and an additional planet carrier 16 that may be provided.

Figure 3:
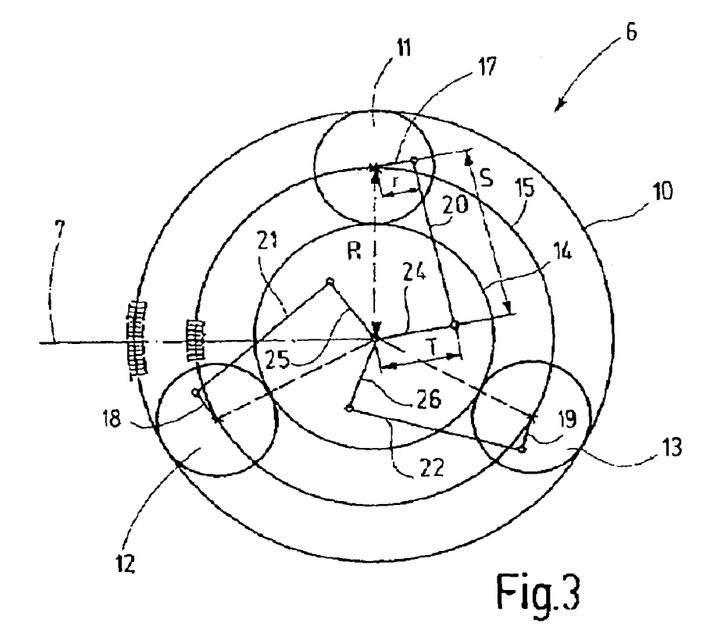
FIG. 3 is a schematic representation of the reduction gear according to FIG. 2.

As illustrated in FIG. 2 with the aid of the planet gear 11 and as follows on the whole from FIG. 3, the planet gears 11, 12, 13 are each fixedly connected to a separate crank 17, 18, 19, which together form the input of the coupling mechanism 9. The cranks 17, 18, 19 are connected via tow rods or connecting rods 20, 21, 22 to a carrier plate 23 which has a coupling location for each connecting rod 20, 21, 22. The carrier plate 23 can be formed as a disk or star and is connected torque-proof with the shaft 5. The distance between the axis of rotation for the shaft 5 and the respective coupling location for the connecting rod 20, 21, 22 forms respectively one lever arm 24, 25, 26. The lengths r of the cranks 17, 18, 19, which are connected to the planet gears 11, 12, 13, are identical in length. In addition, the cranks 17, 18, 19 have the same orientation on the planet gears 11, 12, 13.

The lengths S of the connecting rods 20, 21, 22 are also identical. The lengths T of the lever arms 24, 25, 26 furthermore are identical as well. The following relationship exists for the lengths r, T and S:

$$T=(2\cdot\sqrt{2}-2)\cdot R$$

$$S=\sqrt{R^2-r^2}$$

$$r=(\sqrt{2}-1)\cdot R$$

R in this case denotes the distance between the axis of rotation for the respective planet gear 11, 12, 13 and the axis of rotation for the sun gear 14.

Figure 4:
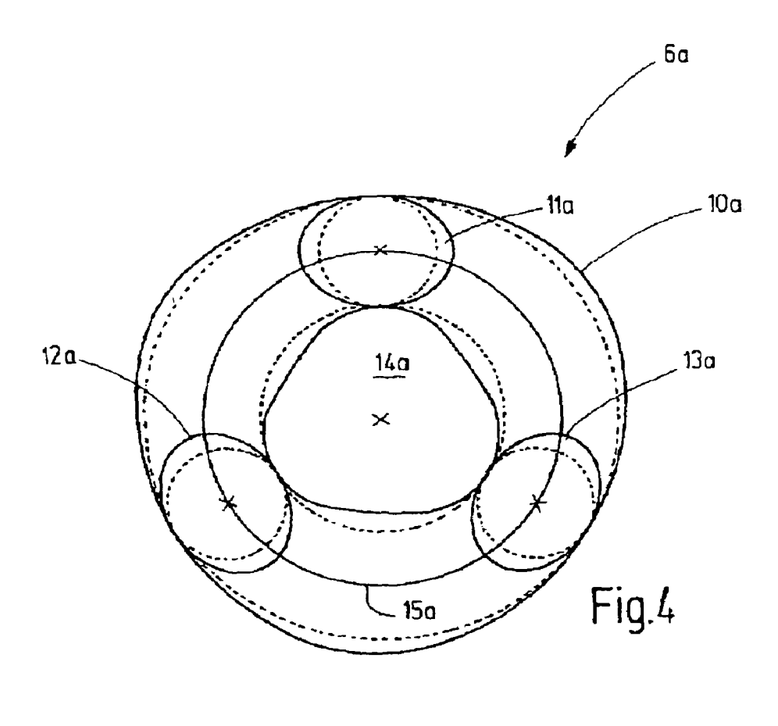
FIG. 4 is a schematic basic diagram of a modified embodiment of the reduction gear.

The planet gear mechanism 8 has a double input drive. As shown in FIG. 2, the planet carrier 15 and the hollow gear 10 are provided with a corresponding hypoid or cone-shaped toothing or are connected to corresponding gears. The toothing of the planet carrier 15 and the hollow gear 10 constantly mesh with the corresponding hypoid gears or the conical gears 27, 28. The conical gears 27, 28 are connected torque-proof to the input shaft 7 while the sun gear 14 is positioned freely rotating and can also be held floating between the planet gears 11, 12, 13. FIG. 3 shows that the planet gears 11, 12, 13 can be embodied as circular toothed gears. The sun gear 14 and the hollow gear 10 correspondingly can also be embodied as toothed gears, meaning that all toothed gears have a constant radius. For one preferred embodiment, however, non-circular planet gears 11a, 12a, 13a are used. In FIG. 4, the deviations from the circular shape are shown with bold lines while the circular shape is respectively indicated with dots. A non-circular sun gear 14a and a non-circular hollow gear 10a are also provided, wherein the sun gear 14a is optional and can be omitted. The planet gears 11a, 12a, 13a respectively have at least one minimum and one maximum radius and preferably two minimum and two maximum radii. The maximum and the minimum radii for the sun gear 14a and the hollow gear 10a correspond to the number of planet gears. The circumferences of the planet gears 11a, 12a, 13a and the sun gear 14a as well as the hollow gear 10a are correlated to each other, so that a planet gear 12a for a monitoring device that is securely attached to the sun gear 14a executes precisely one half rotation to assume the position of its predecessor or follower.

Figure 5:
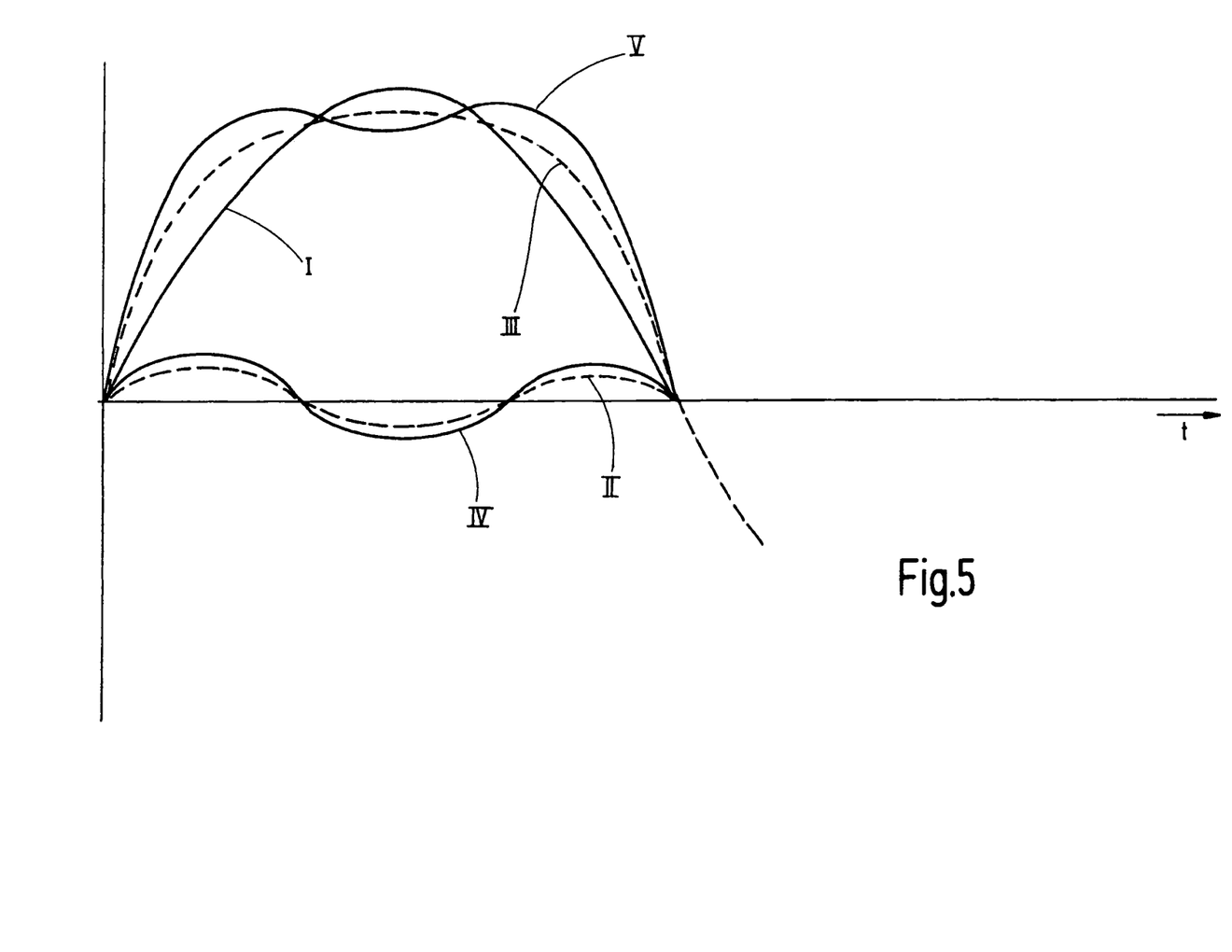
FIG. 5 is a schematic representation of the oscillating movement of the heald shaft, using different movement modulations.

The shaft gear mechanism 2, described so far operates as follows:

The shaft 7 rotates the planet carrier 15 and the hollow gear 10 and/or 10a with constant, different rotational speeds. As a result of the difference in the rotational speeds between the hollow gear 10 and/or 10a and the planet carrier 15, the planet gears 11, 12, 13 and/or 11a, 12a, 13a execute a roll-off movement along the inside toothing of the hollow gear 10 or 10a. This rotational movement is translated via the cranks 17, 18, 19 to a back and forth movement of the connecting rods 20, 21, 22, thereby transmitting the uniform rotational movement of the planet carrier 15 to the carrier plate 23, together with an additional superimposed oscillating movement (meaning periodic acceleration and delay). With respect to this, FIG. 5 illustrates a sinusoidal oscillation movement in a first curve I, such as would be carried out by the heald shaft 1 if driven in the standard way by a uniformly rotating eccentric cam disc. The time-dependent change in the differential angle, caused by the oscillating movement of the connecting rods 20, 21, 22, is plotted as curve II in FIG. 5. The gear 6b according to FIG. 3 generates a rotational movement at its output, at the shaft 5, which is superimposed by the oscillating movement according to curve II. A connected heald shaft that is driven via an eccentric cam disc then carries out a movement as shown with dashed curve III.

The schematically illustrated gear 6a according to FIG. 4 generates an additional modulated movement at its output shaft 5 because the rotation of the planet gears 11a, 12a, 13a is irregular as a result of the intentional non-circular design. As an example, curve IV illustrates the differential angle of rotation φ between the input shaft and the shaft 5 for the gear 6a. If the shaft 5 driven in this way is used as a drive for the shaft gear 2 and thus drives the heald shaft 1 via an eccentric cam, then the heald shaft can execute a movement as shown with the curve V.

In order to generate a periodic acceleration and delay movement that is superimposed on the rotational movement, the gear 6a comprises two means: a non-circular toothed gear and a coupling mechanism. The non-circular toothed gear can be embodied as a planet gear. The combination of the non-circular toothed gear and the coupling mechanism makes it possible to realize laws of motion which cannot be realized separately with a non-circular toothed gear or a coupling mechanism.

With a corresponding non-circular design for the planet gears 11a, 12a, 13a and the associated hollow gear 10a as well as the optional sun gear 14a, it is possible to realize nearly any type of movement curve for the heald shaft 1. As a result, the accelerations occurring at the heald shaft 1 can be minimized, wherein the sheds are opened for the maximum amount of time, that is to say the times during which the heald shaft 1 remains in the upper or lower position. In addition, the mechanical loads for the rod assembly 3, the heald shaft 1, as well as the shaft gear 2 can be reduced to a minimum, thereby making it possible to increase the number of revolutions for the weaving machine.

Figure 6:
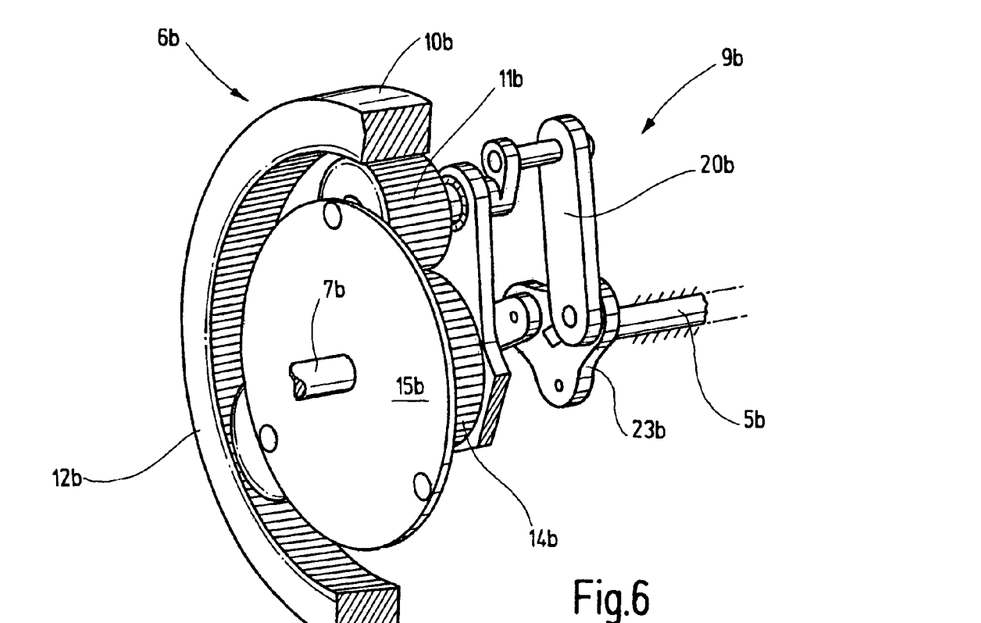
FIGS. 6 & 7 are different designs for the reduction gear, shown in a schematic, partially corporeal and partially sectional perspective view.

FIG. 6 illustrates a modified embodiment of the gear mechanism according to the invention in the form of the gear mechanism 6b, for which the planet carrier 15b rotates freely while the sun gear 14b is driven. The hollow gear 10b is positioned torque-proof with the aid of suitable means. The planet gears 11b, 12b, can be embodied circular or non-circular, as shown in FIGS. 3 and 4. The above description applies in this case, as for the other function description, wherein it is only necessary to add a letter index "b" to the reference numbers.

Figure 7:
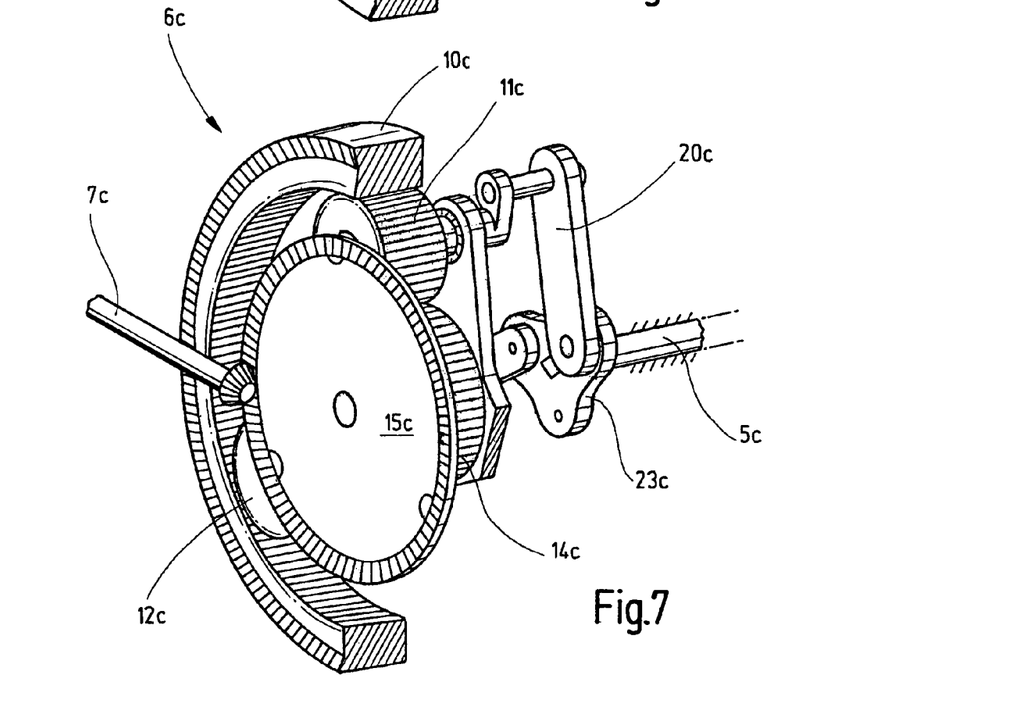

A different, modified embodiment of a gear mechanism according to the invention is shown in FIG. 7 in the form of the gear mechanism 6c, for which only the planet carrier 15c is driven so as to rotate. The hollow gear 10c is secured non-rotatably with the aid of suitable means. The sun gear 14c is positioned freely rotating and functions to balance the forces between the planet gears 11c, 12c and, if necessary, the third planet gear that is not shown in further detail herein; the sun gear 14c can be omitted.

Alternatively, the sun gear 14c can also be positioned in the center, such that it cannot rotate, while the hollow gear 10c is positioned so as to rotate freely or can be omitted. The sun gear 14c can again be embodied circular or non-circular, depending on whether the planet gears 11c, 12c, 13c are circular as shown in FIG. 3 or non-circular as shown in FIG. 4. Otherwise, the above description applies correspondingly, wherein a letter index "c" must be added to the reference numbers for the description relating to FIGS. 1 to 3 and the letter index "a" must be replaced with "c" for the embodiment shown in FIG. 4.

Figure 8:
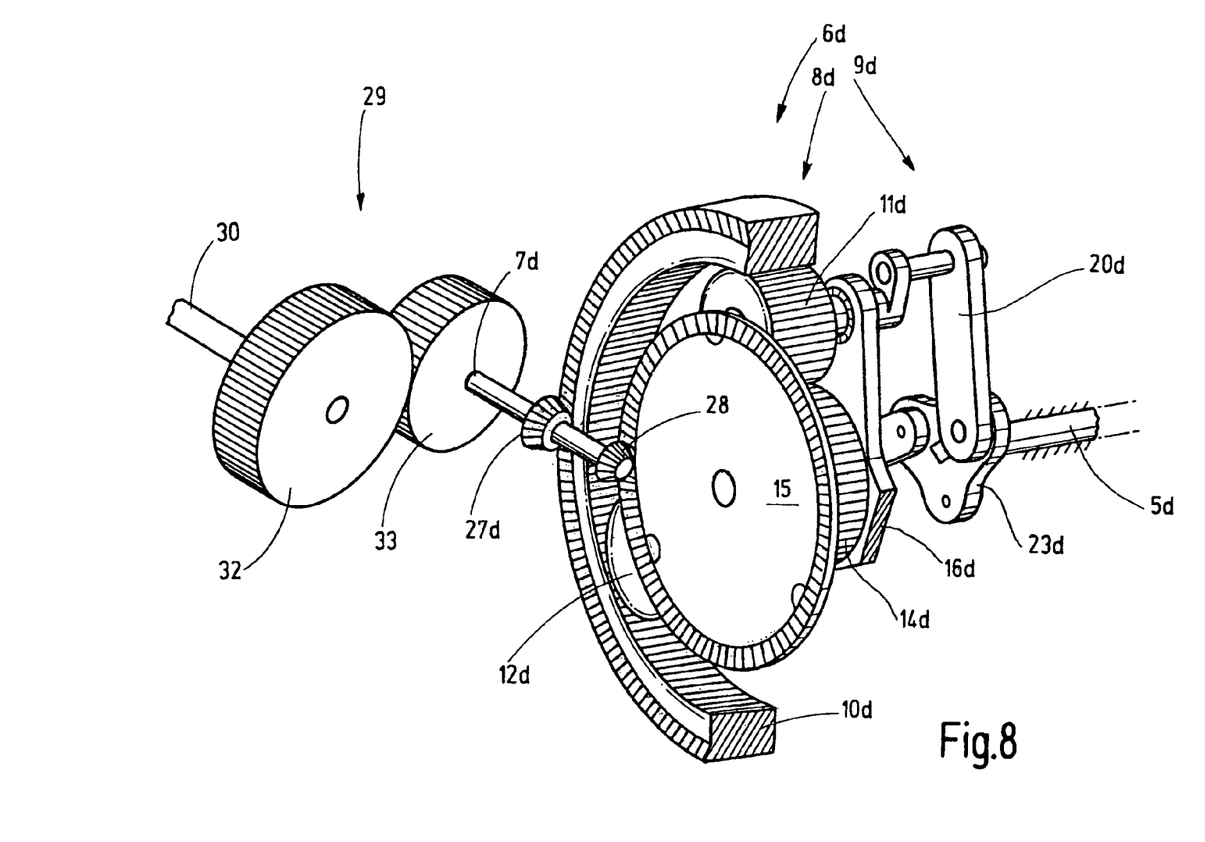
FIG. 8 illustrates a modified embodiment of the reduction gear shown in a schematic diagram.

According to a different alternative, shown in FIG. 8, it is possible to install a non-circular toothed gear 29 in series before the planet gear 6d, wherein this non-circular gear translates a uniform rotation of a drive shaft 30 to an accelerated and delayed rotational movement at the shaft 7d. If the planet gear 6d is embodied with circular toothed gears, e.g. as shown in FIG. 3, then the number of required non-circular toothed gears is reduced to two. Different laws of motion can be realized by replacing the non-circular toothed gears 32, 33. However, the planet gear can also be embodied as additional non-circular toothed gear, as shown in one of the FIGS. 2 to 7. Otherwise, the previous description also applies accordingly, wherein a letter index "d" must be added to the reference numbers for the description relating to FIGS. 1 to 3 and the letter index "a" must be replaced with the letter index "d" insofar as FIG. 4 is concerned.

Figure 9:
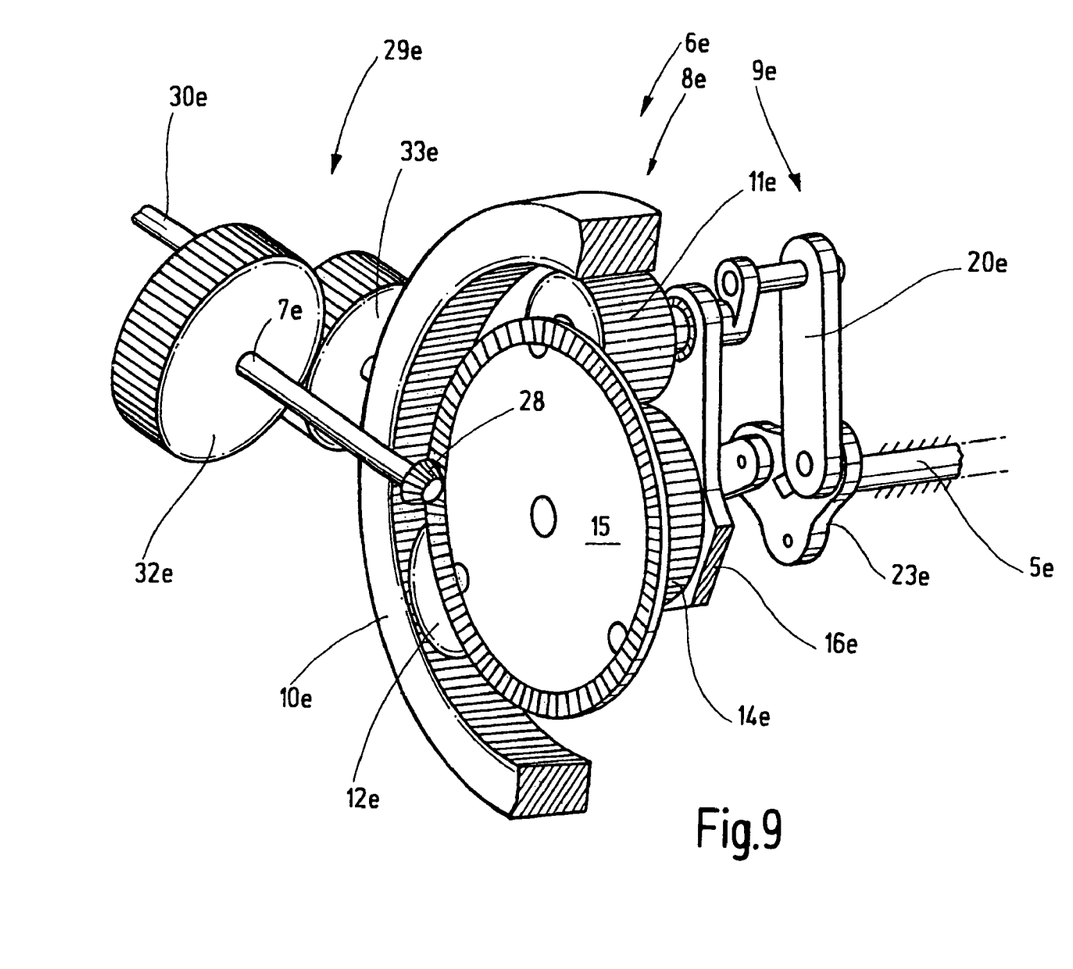
FIG. 9 is a schematic diagram of a different modified embodiment of the reduction gear.

Finally, FIG. 9 shows that a non-circular toothed gear 29e can be connected in series before the planet gear 6e in order to convert a uniform rotation of the drive shaft 30e to an accelerated and delayed rotational movement at the shaft 7e, which only functions to drive an "input" of the planet gear 6e. The shaft 30e directly and with uniform rotation drives a different "input" for the planet gear 6e. In each case, the "input" can be either at the planet carrier 15e, the hollow gear 10e, or the sun gear 14e. If the planet gear 6e is embodied with circular toothed gears, e.g. as shown in FIG. 3, the number of required non-circular gears is reduced to two. By exchanging the non-circular gears 32e, 33e, different laws of motion can be realized. As a result of the distribution of power, the gear 29e with non-circular gears need only transfer a portion of the driving energy.

The planet gear 6e can also be embodied as additional non-circular toothed gear as shown according to one of the FIGS. 2 to 7. Otherwise, the above description applies correspondingly, wherein a letter index "e" must be added to the reference numbers for the description relating to FIGS. 1 to 3 and the letter index "a" in FIG. 4 must be replaced with the letter index "e."

The present invention relates to a gear mechanism for the drive assembly of a heald shaft 1, wherein the gear mechanism 6, 6a, 6b, 6c comprises an input shaft 7, 7b, 7c and an output shaft 5, 5b, 5c. The gear mechanism 6, 6a, 6b, 6c generates a differential angle of rotation between the input shaft 7, 7b, 7c and the output shaft 5, 5b, 5c, onto which an oscillating change is superimposed, in dependence on the angle of rotation. This oscillating change can differ from a harmonic oscillation as a result of the non-circular embodiment of the planet gears 11a, 12a, 13a for the gear mechanism 6a, 6b, 6c, thereby making it possible to realize nearly optional movements for the heald shaft 1 with low stress on gear and bearings, as well as to provide easy production options and a compact design.

It will be appreciated that the above description of the present invention is susceptible to various modifications, changes and adaptations, and the same are intended to be comprehended within the meaning and range of equivalents of the appended claims.

LIST OF REFERENCE NUMBERS:

1 heald shaft
2 shaft drive
3 rod assembly
4 rocker
5 shaft
6 gear mechanism
7 input shaft
8 planet gear
9 coupling mechanism
10 hollow gear 11 planet gear
12 planet gear
13 planet gear
14 sun gear
15 planet carrier
16 planet carrier
17 crank
18 crank
19 crank
20 connecting rod
21 connecting rod
22 connecting rod
23 carrier plate
24 lever arm
25 lever arm
26 lever arm
27 conical gear
28 conical gear
29 non-circular toothed gear
30 drive shaft
31
32 non-circular toothed gear
33 non-circular toothed gear
I-V curve

The invention claimed is:

1. A gear mechanism for driving a heald shaft, comprising:
a hollow gear provided with an inside toothing;
at least one planet gear provided with an outside toothing, which constantly meshes with the inside toothing of the hollow gear;
a planet carrier on which the at least one planet gear is positioned such that the at least one planet gear can rotate;
a sun gear provided with an outside toothing, which constantly meshes with the at least one planet gear;
a drive assembly having an input shaft that is connected to at least one of the hollow gear, the planet carrier and the sun gear, for providing continuous different rotational speeds; and,
an output shaft having an output end that is connected via a rod assembly with a heald shaft and an input end that is connected via a coupling mechanism to the at least one planet gear, which planet gear transmits a rotational movement from the input shaft of the drive assembly to the output shaft, and thereby superimposes an additional movement on the output shaft.

2. The gear mechanism according to claim 1, wherein the drive assembly is connected to two elements from among the following elements: the planet carrier, the sun gear and the hollow gear.

3. The gear mechanism according to claim 1, wherein at least one planet gear has a radius (r) that is variable along the circumference.

4. The gear mechanism according to claim 1, wherein the sun gear has a radius (r) that is variable along the circumference.

5. The gear mechanism according to claim 1, wherein the hollow gear has a radius that is variable along the circumference.

6. The gear mechanism according to claim 1, wherein the planet gear has at least one maximum diameter and at least one minimum diameter.

7. The gear mechanism according to claim 1, wherein at least three planet gears are positioned on the planet carrier, wherein these gears respectively mesh constantly with the sun gear and the hollow gear.

8. The gear mechanism according to claim 1, wherein the number of planet gears corresponds to the ratio between the circumference of the sun gear and the circumference of each planet gear.

9. The gear mechanism according to claim 1, wherein the coupling mechanism comprises a crank with length r, which is connected torque-proof to the planet gear, as well as a lever arm with length T that is connected torque-proof to the output shaft and a connecting rod with length S, which connects the crank to the lever arm, wherein the following equations apply:

$$T = (2 \cdot \sqrt{2} - 2) \cdot R$$

$$S = \sqrt{R^2 - r^2}$$

$$r = (\sqrt{2} - 1) \cdot R$$

and wherein R is the distance between the axis of rotation for the planet gear and the axis of rotation for the sun gear.

10. The gear mechanism according to claim 1, wherein a non-circular toothed gear is installed in series before the gear mechanism.

11. The gear mechanism according to claim 1, wherein the input shaft is connected to the planet carrier and to the hollow gear to drive them at different continuous respective speeds, and the sun gear is freely rotatable.

* * * * *